G. M. MERWIN.
ENSILAGE CUTTER.
APPLICATION FILED JUNE 4, 1913.

1,246,976.

Patented Nov. 20, 1917.
5 SHEETS—SHEET 3.

G. M. MERWIN.
ENSILAGE CUTTER.
APPLICATION FILED JUNE 4, 1913.

1,246,976.

Patented Nov. 20, 1917.
5 SHEETS—SHEET 4.

UNITED STATES PATENT OFFICE.

GEORGE M. MERWIN, OF BERWYN, ILLINOIS, ASSIGNOR TO INTERNATIONAL HARVESTER COMPANY OF NEW JERSEY, A CORPORATION OF NEW JERSEY.

ENSILAGE-CUTTER.

1,246,976.

Specification of Letters Patent.   Patented Nov. 20, 1917.

Application filed June 4, 1913.   Serial No. 771,625.

*To all whom it may concern:*

Be it known that I, GEORGE M. MERWIN, a citizen of the United States, residing at Berwyn, in the county of Cook and State of Illinois, have invented certain new and useful Improvements in Ensilage-Cutters, of which the following is a full, clear, and exact specification.

My invention relates to ensilage cutters. It has for its object to feed, cut and deliver ensilage in an improved manner. A further object of my invention is to increase the efficiency and capacity of an ensilage cutter and at the same time render such a machine more safe in operation. I attain these objects by providing improved feeding, cutting and delivery mechanisms coöperating to feed the fodder evenly to the machine, pack the same into a compact charge, cut this charge in an improved manner, and deliver the cut material in an improved manner to the desired point; the entire mechanism being driven through improved means controlled in an improved manner and automatically operable to reverse itself under predetermined emergency conditions.

In order that my invention may be fully and clearly disclosed, I have illustrated in the accompanying drawings one embodiment which the same may assume in practice. It is to be understood, however, that the form shown herein for purposes of illustration may be modified without departing from the spirit of my invention.

In the construction illustrated, I have shown an ensilage cutter carried on a horizontally disposed wheeled frame and provided with a fodder chute communicating with a longitudinally disposed feeding apron or conveyer which automatically feeds the fodder through a feeding box or trough to coöperating feeding mechanism, which in turn automatically feeds the ensilage in the desired quantity to a series of knives carried on a rotatable cutter head journaled on the frame; the ensilage after being cut being carried upward by a fan through an opening in a suitable casing for delivery to the silo. Coöperating with these mechanisms is also an improved controlling mechanism whereby the driving mechanism for the machine may be reversed manually when desired and is reversed automatically under predetermined emergency conditions.

Figure 1:
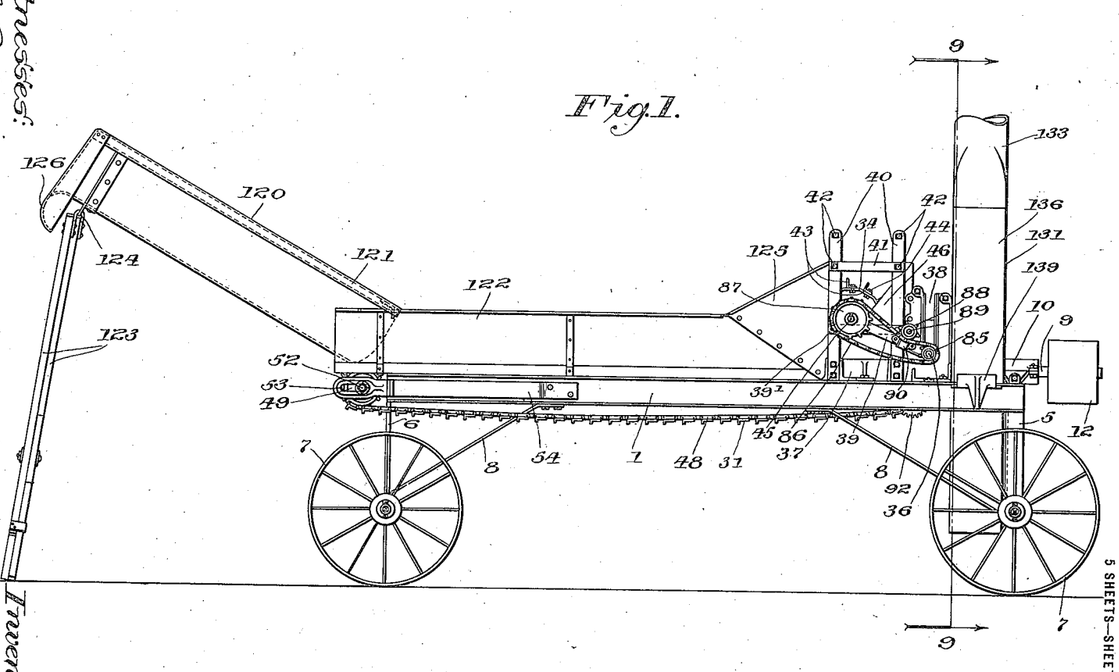
Figure 1 is a side elevation of the complete ensilage cutter.
Figure 2:
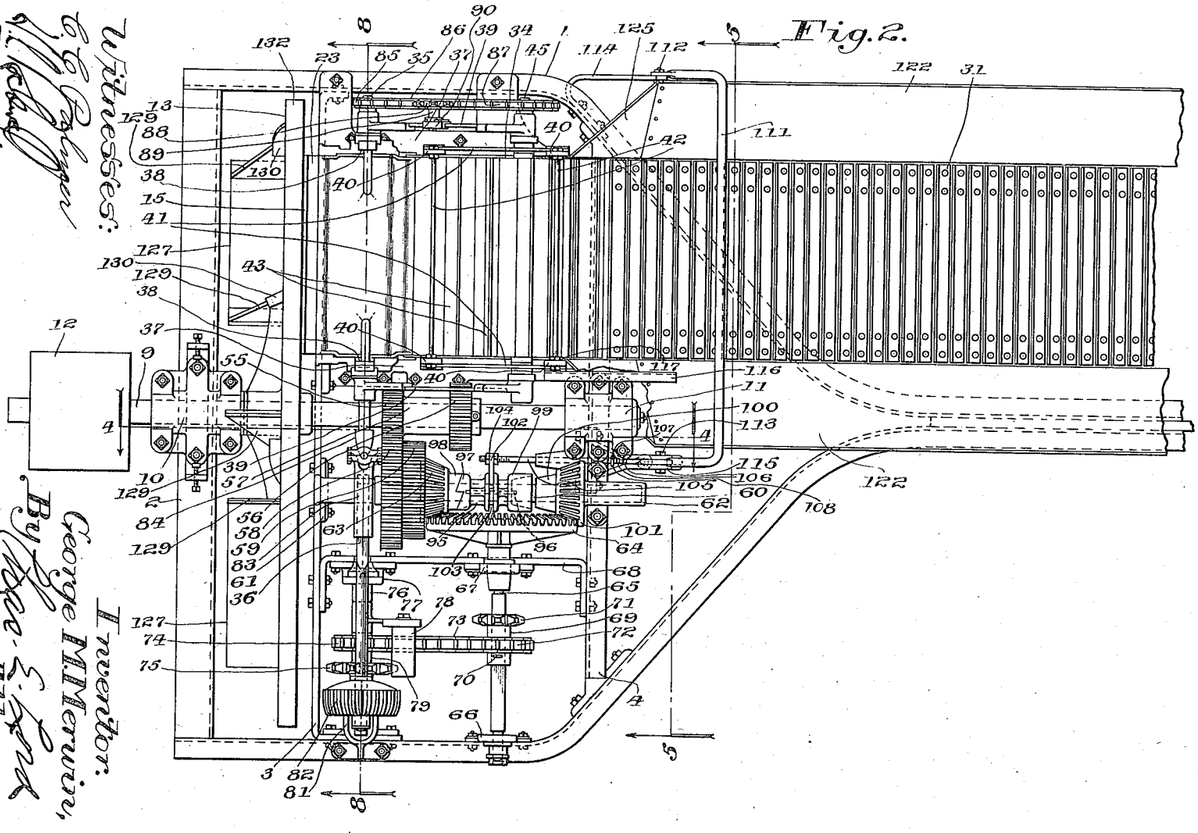
Fig. 2 is a top plan view of a portion of the machine.

The frame shown is substantially Y shaped, comprising a plurality of rigid, horizontal members 1 formed of channel material rigidly attached one to the other in parallel relation at their rear ends and diverging intermediate their ends so that they form an enlarged substantially oblong base for the driving, cutting and feeding mechanism at the front of the machine (Fig. 2). These frame members are connected at their front ends by a rigid transversely extending frame member 2 and coöperate with a pair of supplementary transversely extending spaced frame members 3 and 4 to form a rigid frame and base for the ensilage cutter mechanism. The frame thus formed is carried upon rigid vertical standards 5 and 6 at its opposite ends, which in turn are supported upon wheels 7 so that it may be readily moved from place to place, braces 8 being provided between the axle members and points intermediate the ends of the main frame in order to reinforce the standards 5 and 6.

Figures 9, 10, 11, 12, 13, 14:
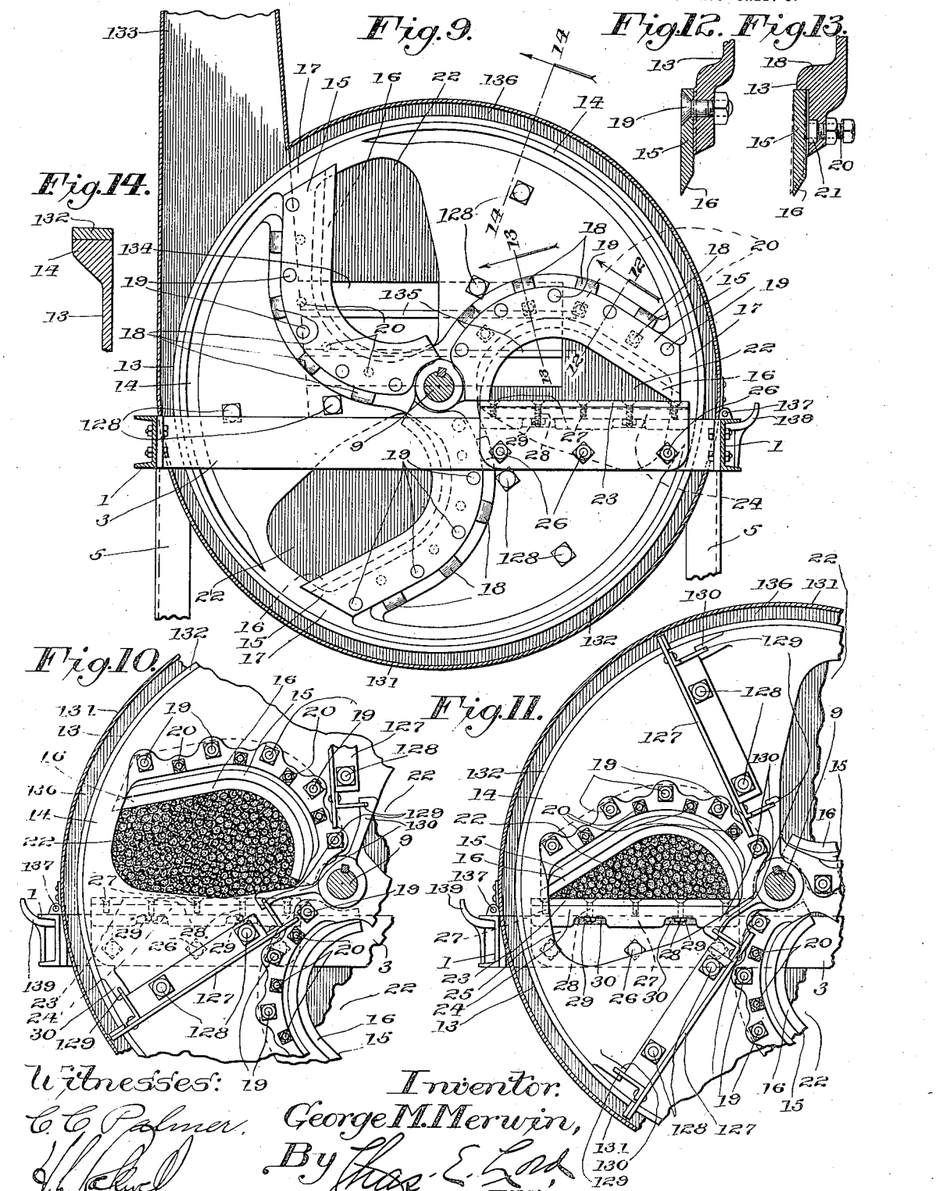
Fig. 9 is a sectional view slightly enlarged on line 9—9 of Fig. 1.
Figs. 10 and 11 are detail views showing one of the knives in a plurality of positions.
Figs. 12 and 13 are sectional views on lines 12—12 and 13—13 respectively of Fig. 9.
Fig. 14 is a sectional view on line 14—14 of Fig. 9.

Disposed longitudinally of the frame thus formed, is a rotary power shaft 9 journaled in side and end bearings 10 and 11 mounted on the transverse frame members 2 and 4 respectively. The front end of this shaft projects beyond the machine frame and carries a power pulley 12 adapted to be rotated from any suitable source of power, while intermediate the ends of the shaft a rotary cutter head 13 is fixed to the shaft and adapted to rotate therewith between the transverse frame members 2 and 3. As shown in Figs. 9 and 14, this cutter head is of disk shape and provided with a heavy rim 14 in order to give it a high fly wheel effect when rotated by the power pulley 12. On the inner face of this cutter head a plurality of vertically disposed curved cutters or knives 15 are carried.

These knives, as shown in Figs. 9, 10 and 11, extend from points adjacent the hub of the cutter head to points adjacent the periphery of the same and are provided with wide tapered blades 16 of such conformation that the cutting edge between the ends thereof is of a substantially greater length than a straight line drawn between these ends; this cutting edge extending upward at an angle from the outer end of the knife, near the periphery of the cutter head, to a point substantially in the middle of the knife, where it is curved downward in the shape of an arc; the inner end of the blade terminating adjacent the hub of the cutter head. As shown in Figs. 9 to 13, each of these knives is carried on a raised shoulder 17 on the cutter head which conforms substantially to the shape of the blade and is securely positioned against backward movement by a plurality of spaced lugs 18, likewise formed on the cutter head, in addition to being bolted to the cutter head by a plurality of bolts 19. Further, as shown in Fig. 13, in order that their cutting edges may be adjusted laterally within certain limits with respect to the cutter head, adjusting bolts 20 are provided having lock nuts 21 carried on the ends thereof in suitable correspondingly shaped recesses in the cutter head and between the latter and the knife body 15; this construction being used so that in cases of stripped threads it is only necessary to replace a nut or bolt. As clearly illustrated in Figs. 9, 10 and 11, the cutter head is also cut away adjacent each blade to form a plurality of irregular shaped openings 22 therein conforming substantially to the shape of the cutter blades through the length of the latter, and at the outer end of the same extending downward and then slightly angularly toward the power shaft in such a manner as to form a substantially oblong opening in the cutter head through which the fodder ends may pass to be acted upon by the knives.

In the construction illustrated, I have shown the cutter head to be equipped with three knives 15 and three fodder openings 22; the knives successively coöperating with a single horizontally disposed, transversely extending reversible cutter bar 23 having cutting faces on each side of the same, which is carried upon a transversely disposed support 24, longitudinally flanged at 25 and bolted to the transverse frame member 3 by bolts 26. In a preferred form this cutter bar is of a length slightly greater than the distance between the inner and outer ends of the cutter blades and is rigidly attached to the support 24 in such a manner as to form a substantial cutting base by means of a plurality of vertically extending countersunk screws 27 and countersunk bolts 28, the nuts 29 of which are received in recesses 30, formed in the lower part of the member 24 and extending into the flange 25 thereon, in such a manner that while the nuts 29 may be readily adjusted to tighten the cutter bar, the latter cannot by any chance swing into the path of the knives, the bolts 28 not being removable except by manual manipulation from the top of the cutter bar, as the distance between the lower ends of the bolts and the bottom surfaces of the recesses 30 is not sufficient to permit the nuts to be separated from the bolt.

This cutter head is rotated upon rotation of the power pulley 12 in such a manner that the knives successively pass the vertical face of the cutter bar 23 and sever the stalks fed thereto with a shear cut throughout their entire length. At the beginning of the cutting operation each of these knives first occupies the position shown in Fig. 10, the curved heel of the knife automatically preventing lateral displacement of the stalks and coöperating with the slanting surface of the knife in holding them securely in position upon the cutter bar as the outer end of the blade moves downward to the position shown in Fig. 11. As the knife moves downward from this position, both ends of each blade simultaneously pass the cutter bar and, due to the more rapid movement of the outer end of the blade, a pronounced inward shear is obtained. As each knife continues its downward movement, this shearing cutting action continues, the curved portion or heel of the blade moving outward as it moves downward to position the material and the maximum cutting action being exerted near the power shaft by this heel or curved portion which, due to its shape, not only automatically positions the material to be cut by the slanting edge of the knife, but also acts to position the material which it cuts itself in such a manner that even when the knife is dull, the fodder is accurately positioned and no corn is shelled off the cob.

Coöperating with these knives is an improved automatic force feeding mechanism which acts to supply the fodder to the knives evenly and without clogging the throat of the machine, thus insuring even running of the machine at maximum capacity. This mechanism, after each cutting operation, automatically packs material to be cut against the face of the cutter head between the openings 22 so that after each knife acts, the fodder is so positioned that the next knife will sever it; a bunch of fodder of the exact cross section of the opening being forced the desired distance through the latter and under the knife by the feeding mechanism as soon as each opening comes opposite the ends of the fodder.

Figures 3, 8:
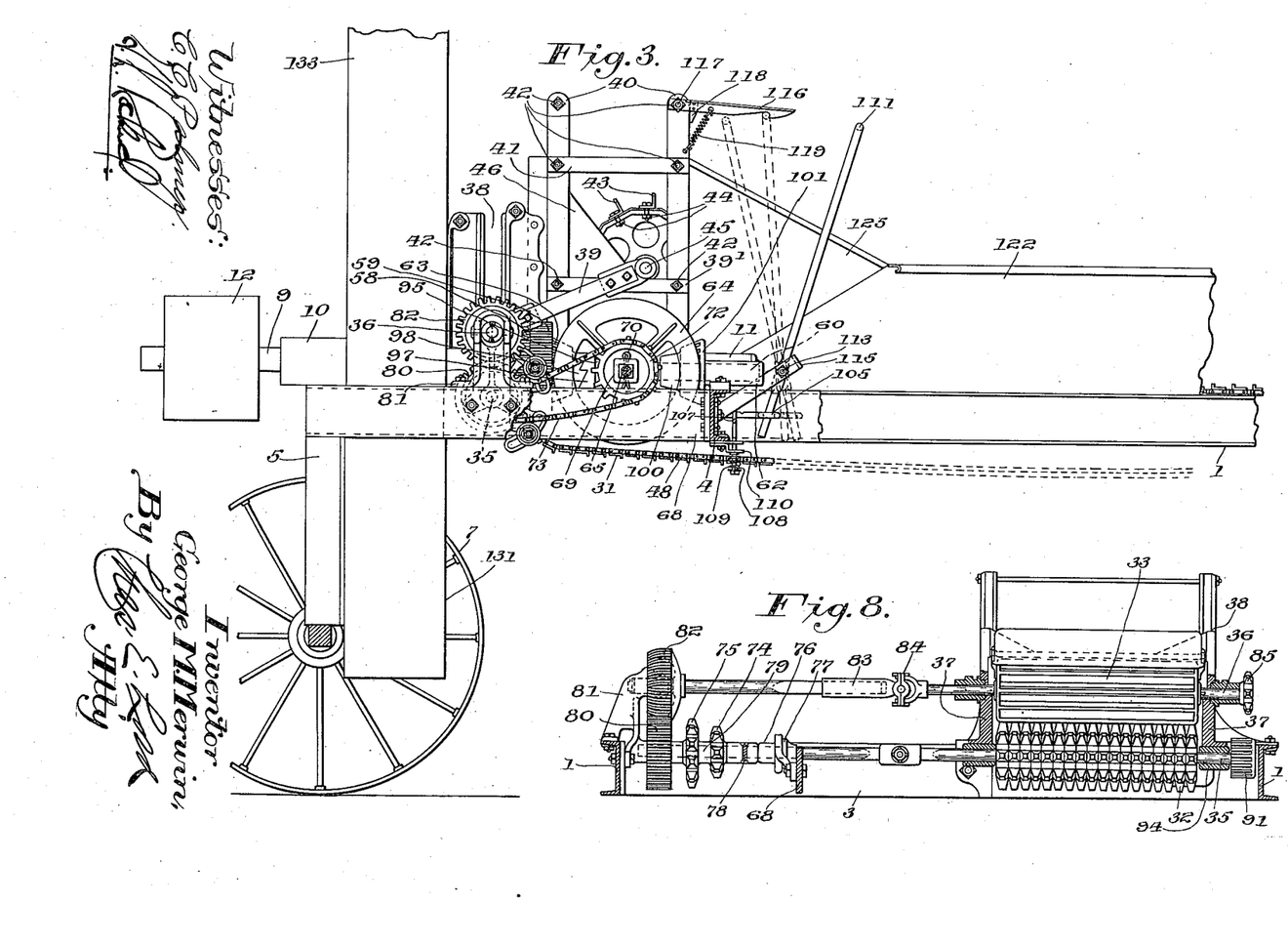
Fig. 3 is a side elevation of the construction shown in Fig. 2.
Fig. 8 is a sectional view on line 8—8 of Fig. 2.
Figures 4, 5, 6, 7:
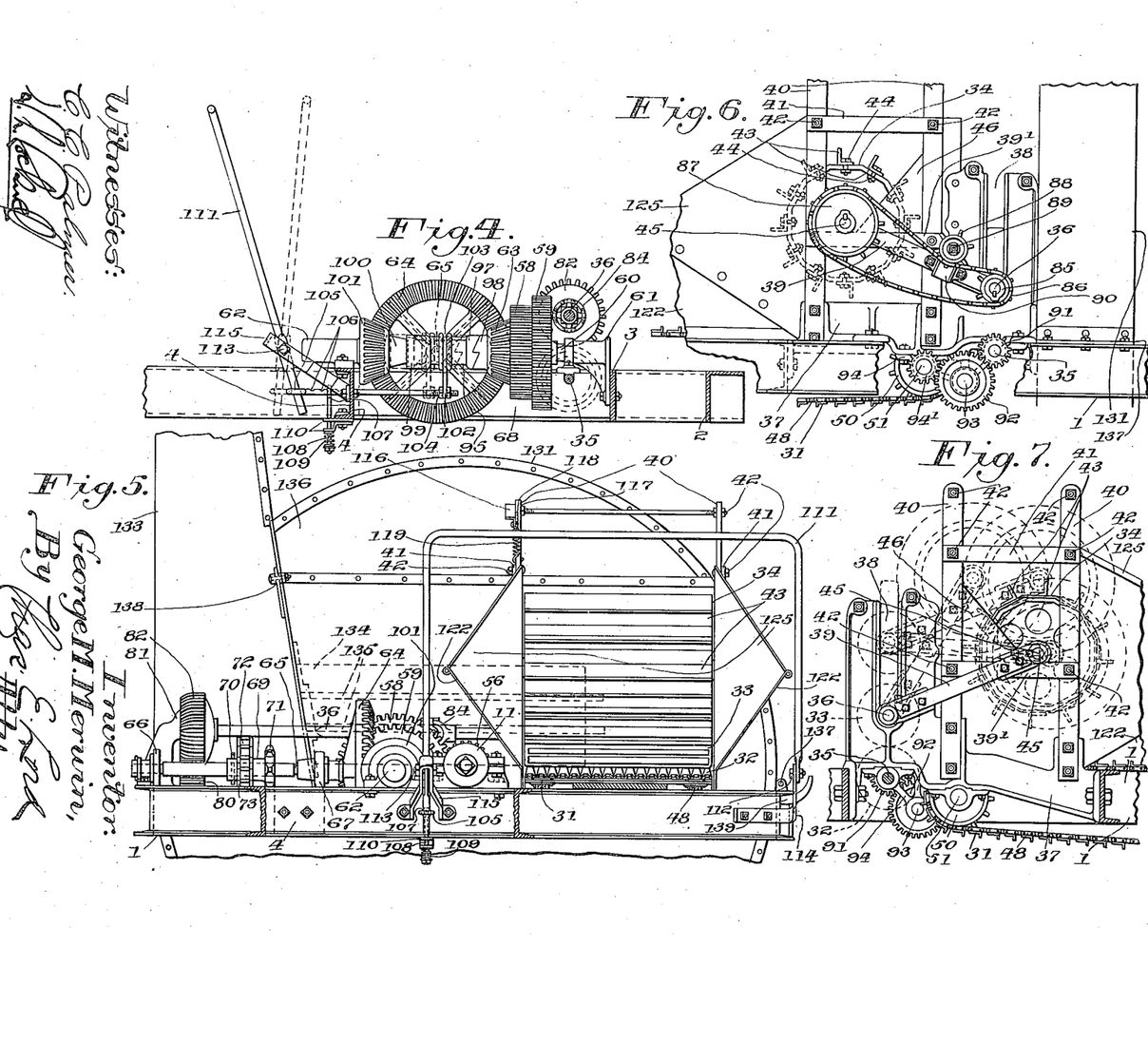
Fig. 4 is a longitudinal sectional view on line 4—4 of Fig. 2.
Fig. 5 is a transverse sectional view substantially on line 5—5 of Fig. 2.
Fig. 6 is a side elevation of the floating feeder and controlling and conveyer mechanism.
Fig. 7 is a side elevation of the same mechanism from the opposite side of the machine.

This feeding mechanism is disposed longitudinally of the frame and comprises a flexible feeding apron 31 and coöperating feeding rolls 32, 33 and 34, all rotating at the same surface speed as said apron. As shown in Figs. 7 and 8, the rolls 32 and 33 are carried one above the other on horizontally disposed, transversely extending shafts 35 and 36 supported in a plurality of longitudinally extending supplemental frame members 37 carried on the main frame on opposite ends of the cutter bar 23. Of these rolls, the lower roll 32 is provided with a plurality of longitudinally extending series of spaced truncated teeth, while the periphery of the upper roll 33 is provided with a plurality of longitudinally extending strips adapted to coöperate with these teeth, the projecting members on each roll biting into the fodder supplied between the same and feeding the same forward without slipping. As shown in Fig. 8, the roll 33 is freely movable upward in slots 38 in the supplemental frame 37, in order to accommodate it to operate under different conditions, and, as illustrated in Figs. 3, 6 and 7, is connected at its ends through a pair of pivoted links 39 with the floating feeder roll 34.

This roll 34 is larger than the rolls 32 and 33 and supported by a pair of parallel longitudinally disposed supports 39' attached at their ends to vertical standards 40 fixed on the supplemental frame members 37 and braced by additional longitudinal supports 41 and bolts 42. As shown in Fig. 3, this roll 34 is substantially polygonal in cross section and provided on its flat faces with longitudinally disposed members 43 of angle cross section attached to the metallic body of the roll by suitable bolts 44 extending through their bases; the whole series forming a roll having radially projecting, longitudinally disposed members thereon adapted to bite into the stalks to exert a non-slipping feeding action upon the material fed beneath the same in coöperation with the rolls 32 and 33. As clearly illustrated in Fig. 7, this roll 34, like the roll 33, is adapted to rise when material is fed under the same, the shaft 45 upon which this roll is carried being movable from position upon the support 39' up the inclined surface of a pair of spaced guiding members 46 carried between the standards 40. It is to be noted that this roll 34 by reason of its weight and position, exerts a powerful downward pressure upon any material beneath the same, tending to compress the same at the same time that it is fed forward and also to securely position the outer ends of the stalks as their inner ends are being operated upon by the knives. Attention is further directed to the fact that when bunched material is fed under the rolls, the roll 34 is raised to the dotted line positions shown in Fig. 7, and by its weight and its pivotal connection to the roll 33, compresses the material and forces it between the rolls 32 and 33.

Coöperating with these feeding rolls 32, 33 and 34 is the traveling conveyer 31 which feeds the corn stalks thereto. As shown in Figs. 1, 3, 6 and 7, this conveyer 31 is flexible and formed of a plurality of parallel, transversely disposed slats of L shaped cross section adapted to feed the fodder forward positively, carried on chains 48 which are rotated by sprockets 49 and 50 journaled in the opposite ends of the main frame. As shown, the sprocket 50 is carried on a shaft 51 located on the under side of the frame, intermediate the rolls 33 and 34, while the sprocket 49 is carried on the extreme rear end of the frame and is rotatable with a shaft 52 longitudinally adjustable in a slot 53 formed in a supplemental frame 54 in such a manner that the length of the conveyer may be adjusted as desired.

The rotation of the shaft 9 is conveyed to all of the parts of this feeding mechanism through one of a plurality of speed changing gears 55 and 56 of different sizes carried on a sleeve 57, adjustably mounted on the shaft 9 intermediate its ends and between the frame members 3 and 4; the speed of the feeding mechanism, and therefore the length of cut, being regulated by an adjustment of these gears on the shaft 9. As shown, these gears are adapted to coöperate with a plurality of stepped gears 58 and 59 carried on a longitudinally disposed stub shaft 60 journaled in bearings 61 and 62 carried on the frame members. Fixed to this shaft 60 at a point adjacent the inner gear 59, is a small beveled gear 63 meshing with a larger beveled gear 64 disposed parallel to the shaft 60 and carried on a short transversely extending stub shaft 64 journaled in bearings 66 and 67 on the main frame and a longitudinally disposed supplemental frame member 68 respectively. Upon this shaft 65 a sleeve 69 is attached by any removable attaching means 70, the sleeve being longitudinally adjustable along the shaft and carrying a plurality of sprockets 71 and 72 of different diameters, each of which is adapted to drive through a chain 73, one or the other of a corresponding pair of sprockets 74 and 75 of different diameter carried on the shaft 35 on which the lower feed roll 32 is mounted. It is here to be noted that by the provision of the two pairs of sprockets of different sizes and the adjustable gears 55 and 56, I am able to obtain a total of eight lengths of cut, by simply adjusting the sleeve 69 until the desired sprockets register and adjusting the sleeve 57. In a preferred form, a sleeve 76 is carried upon the shaft 35 and integral with this sleeve a bracket 77 is formed to carry a chain tightener 78 for the chain 73, while the two sprockets 74 and 75 are preferably formed integral with a second sleeve 79 also carried on this shaft, adjacent the sleeve 76. The movement of the shaft 35 is transmitted from this shaft through a gear 80 preferably formed integral with this sleeve and mounted between the sprockets 75 and a suitable bracket 81 formed on the outside frame member 1. Journaled in this bracket 81 is one end of the shaft 36 on which the upper feed roll 33 is carried; this shaft being provided adjacent its end with a wabble gear 82 meshing with the gear 80, and intermediate its ends with an extensible telescoping portion 83 to enable the roll 33 to rise freely in the slots 38, and a universal joint connection 84 to permit the roll to move independently of the gear 82 when desired. Upon the opposite end of the same shaft 36 a small sprocket 85 is provided upon which is carried a chain 86 connected with a larger sprocket 87 carried on the end of the floating feeder shaft 45; this chain being held at the desired tension by means of an idler sprocket 88 journaled on a stub shaft 89 which is fixed to a bracket 90 on one of the links 39. Obviously, since the floating feeder roll 43 is thus operatively connected to the rolls 32 and 33, the speed of rotation of the same will be simultaneously adjusted at the same time that the speed of rotation of the other rolls is adjusted, namely, by shifting the speed connections on the gears 55, 56, 58 and 59 and sprockets 71, 72, 74 and 75, the floating feeder roll through its gearing connection always rotating at the same speed as the rolls 32 and 33. The feeding apron or conveyer 31 which feeds the material to these rolls is likewise driven from the same power connection and controlled by the same speed adjusting mechanism, a gear 91 being fixed to the shaft 35 at a point between the frame 37 and one of the main frame members 1 and connected through a gear 92, journaled on a shaft 93 in a depending bracket 94, to the sprocket 50 through a smaller gear 94'.

Coöperating with the cutting and feeding mechanisms already described, is an improved controlling mechanism. This mechanism comprises an adjustable clutch sleeve 95 splined at 96 to the stub shaft 60; the sleeve being provided with a ratchet face 97 on one end adapted to coöperate with a corresponding clutch member 98 preferably formed integral with the beveled gear 63, while on its opposite end it is provided with a frictional driving member 99 adapted to coöperate with a cone shaped driven member 100 preferably formed integral with a beveled gear 101 corresponding to the gear 63 and adapted to coöperate with the beveled gear 64 to reverse the mechanism when the clutch member 95 is moved from the position shown in Fig. 2, so that its friction clutch is in engagement and the positive clutch on the opposite end of the same is disengaged. The means for reciprocating this clutch 95 is shown to comprise a movable clutch actuating member 102 receivable in an annular groove 103 on the clutch member and adjustably attached at 104 to a longitudinally disposed hook 105 movable through an opening in the frame member 1 and having a plurality of notches 106 upon its upper surface, one of which is normally engaged by the hooked end 107 of a vertically extending pin 108 normally held in depressed position by a spring 109 and guided in its movement by a bracket 110 attached to the under side of the main frame. Coöperating with this member 105 and extending through the eyelet in the end of the same is a U shaped bail 111 pivoted at 112 and 113 upon suitable supports 114 and 115 carried by the main frame. As shown, this U shaped bail extends transversely across the conveyer 31 and above the same in such a manner that it is readily operable from either side of the machine.

It is to be noted that through the connection of this bail to the clutch mechanism, the feeding mechanism may be either connected positively to the driving mechanism through the clutch members 97 and 98, or connected to the latter through a sliding or frictional connection by means of the friction clutch members 99 and 100, the positive driving connection driving the feeding mechanism in one direction, while the frictional clutch connection drives the mechanism in the reverse direction. It is further to be noted that due to the provision of the resilient means for holding the bail in position, the latter is automatically maintained in any one of the three positions when adjusted thereto, namely, the forward, neutral and reverse, the neutral position being that in which the clutch member 95 is out of engagement with both of the clutch members 98 and 100. Obviously, when the operator desires to start the mechanism, this may be readily accomplished by throwing the bail to the position shown in Fig. 2, wherein the mechanism is positively connected to the power shaft 9. Should, however, a foreign substance be dicovered on the conveyer which is of such a character as to cause damage to the knives, by throwing the bail to the extreme dotted position shown in Fig. 3, the mechanism will be immediately reversed, the positive clutch connection being thrown out and the frictional connection being thrown in so that injury to the knives will be avoided.

In order that an operator having the mechanism running in the reverse direction will not throw the same immediately into engagement with the positive driving member without giving the mechanism time to slow down, I have provided a longitudinally extending catch 116 pivoted at 117 upon the upper end of one of the standards 40 and normally held in its down position with a stop 118 thereon abutting against the standard by means of a spring 119. As shown in Fig. 3, when the bail is in the reverse position, namely, the extreme dotted position shown in that figure, and is moved toward the forward position (shown in full lines), this catch 116 will engage over the upper end of the bail and lock the same at the moment when the mechanism reaches neutral position. This locking mechanism thus serves to stop the feeding mechanism and avoids the danger to the gears arising from the jars incident to throwing the clutch from friction reverse to positive.

A further feature of this controlling mechanism is that it fulfils the function of a safety device for the operator. This is due to the fact that even should an attendant, as for instance, in reaching for an object fed under the roll, unconsciously subject himself to the risk of having his hand or arm carried under the cutter bar, he will, by his forward movement, be obliged to strike the bail 111 with his shoulder, throwing the same automatically from the full line position shown in Fig. 3, to the reverse position shown therein before his hand can be caught between the feed rolls or drawn into the knives; this action automatically reversing the power connections and immediately reversing the forward feeding action of the feeding mechanism and ejecting all objects in the machine throat. It is further to be noted in this connection that in the transition from the full forward feeding position under such conditions to the reverse position, the clutch mechanism is thrown out of engagement with the positive clutch member 98 and into engagement with the frictional clutch member 100, so that this reversal may occur under emergency conditions at any time without injury to the driving mechanism.

In order that the fodder may be guided in its movement to the feeding mechanism and supplied thereto from wagons, as in the usual farm procedure of cutting the ensilage when the fodder is brought directly from the field, I provide a chute or trough 120 having curved longitudinally disposed rims 121 adapted to fit over and engage the upper edges of diverging side boards 122 carried on the main frame at opposite sides of the upper surface of the conveyer 31. Further, I provide a pair of extensible props 123 pivotally connected at 124 to the outer end of this chute and adjustable in a plurality of positions to vary the height of the outer end of the same. Further, in order to automatically guide the stalks into the feeding mechanism, I preferably provide a pair of curved inwardly extending wings 125 attached to the inner ends of the side boards 122 and converging toward the standards 40 to which they are attached, and at the opposite end of the trough 120 I provide a curved shield 126 extending down over the lower edge of the trough as shown to prevent the stalks catching as they are thrown into the chute from the wagon. Obviously, when the fodder is thrown into the trough, it will slide down through the same and be carried by the conveyer 31 to the feeding rolls, which will in turn feed it to the cutting mechanism.

Coöperating with the cutting mechanism and acting to take the chopped ensilage away from the knives, is an improved fan mechanism. This fan mechanism is carried upon the opposite side of the blades from the knives and comprises a plurality of radially extending vanes 127 formed of angle material and bolted at 128 at points intermediate their ends to the cutter head between the openings 22 therein. As shown, these vanes 127 are provided with lateral extensions 129 received in openings in the ends of lugs 130 formed on the outer surface of the cutter head and adapted to position the fan blades securely thereon. Further, in order to additionally secure the blades and at the same time give additional draft and keep the fan casing 131 clear of ensilage, the ends of the blades are projected over a tire 132 shrunk on the cutter head until they extend into immediate proximity with the inner periphery of the casing.

As shown in Figs. 5, 9, 10 and 11, this casing 131 is of the usual cylindrical cross section and provided with a vertically disposed chute 133 leading off therefrom at a point on the opposite side of the frame from the feeding mechanism, as well as the usual draft opening 134, at a point adjacent the side bearing on the shaft 9. Obviously, in order to prevent foreign objects from being drawn into the fan and to prevent injury to the operator, suitable protecting grids 135 are provided across the face of this opening. Further, in order to permit immediate access to the fan, a removable cover 136 is pivotally connected to this casing at 137, cam locking means 138 of any suitable type being provided to hold the same in the closed position, and a supporting bracket 139 being provided to support the cover and prevent too great movement of the same as it is thrown back about its pivot.

In order that the operation of the several coöperating mechanisms may be clearly understood, I will now describe the operation of the complete machine. When fodder is thrown down into the chute 120, it is fed forward by the conveyer 31 and deflected inwardly by the wings 125 on the side boards 122 into the path of the floating feeder roll 43, by which it is compressed and pressed downward so that upon the continued forward movement of the conveyer, the stalks are disposed in parallel relation as they are fed to the two feed rolls 32 and 33 in the form of a compact bundle of a predetermined size. In case a large number of stalks is fed into the chute 120, the floating feed roll 43 will obviously strike against these stalks and be raised thereby to one of the elevated positions shown in Fig. 7 to the middle dotted line position shown in Fig. 7, wherein the rolls 32 and 33 are separated to their maximum and a charge is delivered to the knives which will completely fill the openings 22. Obviously, the rolls 32 and 33 as they feed the fodder forward, will cause the ends of the same to be packed against the portion of the cutter head between the knife edges, the forward feeding action of the same continuing as the cutter head rotates and resulting in the formation of a closely packed bundle of stalks which, upon rotation of the cutter head, registers with one of the openings 22 and is projected through that opening to give any one of the eight desired lengths of cut at which the machine will operate, this regulation of the length of cut being obtained by the adjustment of the multi-speed power connections for the feeding mechanism. After the feeding mechanism has forced the stalks through the opening 22, the curved knife 15 forming the upper edge and one side of that opening, immediately commences to cut the stalks, as shown in Fig. 10. As the knife moves downward from the position shown in this figure, it commences to cut the stalks at the outer end with a shear cut, the stalks being positioned against lateral movement by the curved heel of the knife. This shear cut continues as the blade moves downward from the position shown in Fig. 11, the curved heel of the blade serving to hold the material in position until after the heel has passed by the cutter bar and always insuring a compressed accurately positioned charge which may be readily severed by the blade. Obviously, as soon as the blade commences to pass the cutter bar, the feeding mechanism will again commence to pack the butts of the stalks against the space between that blade and the next blade so that by the time the next blade comes opposite the cutter bar, a second charge will be prepared. Further, when the fodder has been severed by the knives, it will be carried around by the fan blades 126 and carried upward through the spout 133 by the draft developed by that fan; this draft being of great strength due to the fact that to all intents and purposes a vacuum is formed in the casing by the sealing of the feed openings in the interim between each cutting operation, the openings in the cutter head being directly in front of the knives. Should the operator desire to reverse the mechanism at any time, as, for instance, when an obstruction is fed into the machine, this may be readily accomplished by adjusting the bail 111. Further, by the provision of the locking mechanism for the bail when it reaches neutral position, automatic means are provided to prevent injury to the gears when an inexperienced or hasty operator attempts to throw the mechanism from full reverse position to full positive position without giving the parts time to slow down.

It is to be noted that in this construction the cutting, feeding and delivering mechanism is carried upon a rigid frame which is well adapted to stand up in service and withstand the vibration attendant upon the operation of the machine. Further, it is to be observed that the feeding mechanism is entirely automatic in its action and adapted to maintain a constant even feed to the cutting mechanism. Further, due to the improved and simplified power connections therefor, the mechanism may be readily and quickly adjusted, not only to obtain a wide range of variation in the length of cut, but also permit the continuous operation of the machine despite accidental breaking of certain of the gears. The cutting mechanism also is adapted to cut the ensilage with a shear clean cut, and, due to the conformation of the blades, is so constructed that its capacity is materially increased; the power developed being utilized by the same in such a manner as to enable the blades to cut large quantities of fodder in a shorter time. Attention is further directed to the fact that due to the provision of the improved and rugged fan mechanism coöperating with this cutting mechanism, the cutter head and the fan casing, as described, a powerful blower mechanism is provided which, with only three vanes on the cutter head, is adapted to deliver the ensilage at great heights, such as fifty feet and the like, without showing any decrease in the velocity of discharge, or causing choking through the ensilage falling back upon the knife.

While I have in this application specifically described one embodiment which my invention may assume in practice, it is to be understood that the form shown herein for purposes of illustration may be modified without departing from the spirit of my invention.

What I claim as my invention and desire to secure by Letters Patent is:

1. In an ensilage cutter, a substantially disk-shaped cutter head imperforate save for a plurality of radially disposed unobstructed oval openings therein, and a concave knife bolted to said head adjacent to each of said openings overlapping substantially one-half the periphery of said opening and coöperating therewith to form a substantially oblong fodder opening.

2. In an ensilage cutter, a rotary cutter head, and a cutter knife secured thereto, the cutting edge of which comprises an outer elongated toe portion and an inner arcuate heel portion, said knife being so located on said head that a radius drawn from the center of said head to the outer end of said knife will intersect the same intermediate its ends.

3. In an ensilage cutter, a frame, a cutter head journaled thereon, a cutter bar carried on said frame, and a concave knife carried on said cutter head and coöperating with said bar, said knife having an outer elongated toe portion and an inner arcuate heel portion having its heel extending from a point immediately adjacent the axis of said head to approximately the middle of the knife and its toe so disposed that as said head is rotated its heel portion comes opposite said bar in advance of its toe and its toe and heel portion then coöperate in successively cutting the bulk of the charge with an inward shear cut throughout the length of the knife.

4. In an ensilage cutter, a frame, a fan casing having a feed opening therein, a rotary cutter head journaled on said frame rotatable within said casing and having substantially rectangular shaped openings therein, a longitudinally concaved knife overlapping the top and side walls of each opening, a horizontally disposed cutter bar carried on said frame, and means for packing a charge against the imperforate portion of said head in the interval between said openings and for feeding the same therethrough.

5. In an ensilage cutter, a substantially disk-shaped cutter head having fodder openings therein, knives clamped to one face of said head, lugs formed on the opposite face of said head between said openings and said knives, and radially disposed laterally extending fan blades carried on said opposite face and braced on said lugs.

6. In an ensilage cutter, a cutter head of substantially disk shape having a plurality of radially extending ribs, said head being imperforate save for a plurality of radially extending openings therein adjacent one side of said ribs, and a plurality of concave knives rigidly attached to said ribs and having their edges overlapping certain of the edges of said openings and coöperating therewith to form substantially oblong openings.

7. In an ensilage cutter, a cutter head of substantially disk shape having a plurality of radially extending ribs, said head being imperforate save for a plurality of openings disposed adjacent one side of said ribs and having laterally projecting lugs disposed around the edge of said ribs, and a plurality of concave knives rigidly attached to said ribs with their backs abutting against said lugs and their cutting edges overlapping said openings and coöperating therewith to form substantially oblong fodder openings.

8. In a feeding mechanism of the character described, the combination with feeding devices, a chute leading to said feeding devices and arranged to have the operator stationed on either side thereof, and controlling mechanism for said feeding devices, of an arched actuating lever having its end portions pivotally mounted on the respective sides of said chute and having its curved portion elevated above said chute and between said feeding devices and the operator's stations, and an operative connection between said actuating lever and said controlling mechanism.

9. In a feeding mechanism of the character described, the combination with upper and lower feeding rolls, a chute leading thereto and arranged to have the operator stationed on either side thereof, a floating feeding roll disposed above said chute pivoted on and driven from said upper roll, and reversible mechanism for said feeding devices, of an arched actuating lever having its end portions pivotally mounted on the respective sides of said chute and its curved portion elevated above said chute and between said floating roll and the operator's stations, and an operative connection between said actuating lever and said controlling mechanism.

10. In an ensilage cutter, a frame, a rotary disintegrator head mounted thereon, feeding mechanism delivering material to be cut to said disintegrator head, forward and reverse clutch mechanism intermediate said head and said feeding mechanism, a controlling member connected to said clutch connections, and automatic locking means for said forward and reverse clutch mechanism.

In testimony whereof I affix my signature, in the presence of two witnesses.

GEORGE M. MERWIN.

Witnesses:
 RAY PATTISON,
 R. W. MARTIN.